Patented June 29, 1948

2,444,087

UNITED STATES PATENT OFFICE 2,444,087

PROCESS OF RECOVERING AN ASCORBIC ACID COMPOUND

Henry H. Bassford, Jr., Elizabeth, N. J., assignor to Merck & Co., Inc., Rahway, N. J., a corporation of New Jersey No Drawing. Application June 15, 1945, Serial No. 599,744

11 Claims. (Cl. 260—344.5)

This invention relates generally to processes for preparing l-ascorbic acid and related compounds, and particularly to improvements in processes for obtaining such compounds from 2-keto-1-gulonic acid, its analogues, and derivatives thereof.

It is known that rearrangement of 2-keto-1-gulonic acid, its analogues, and derivatives thereof is effected by the action of aqueous hydrohalic acids, either concentrated or dilute, to form l-ascorbic acid and its analogues. The rearrangement product is then recovered from the acid solution by crystallization followed by vacuum concentration of the mother liquors.

Concentrated aqueous hydrohalic acid, for example, concentrated hydrochloric acid, is preferably employed in this rearrangement as it gives a high degree of conversion to l-ascorbic acid or the like, and further because it is possible to recover a substantial portion of the l-ascorbic acid produced as a crude crystalline product by direct crystallization from the concentrated acid rearrangement mixture. After thus recovering a first crop of crude crystalline product, however, recovery of additional product from the mother liquors is difficult to carry out technically, and concentration of the mother liquors is usually accompanied by destruction of about half of the product originally present in the mother liquors. There are statements in the literature to the effect that l-ascorbic acid is stable in concentrated hydrochloric acid. Experiments have shown, however, that l-ascorbic acid actually decomposes in concentrated hydrochloric acid according to a first order reaction and that the half life at 70° C. is about five hours. The high percentage of l-ascorbic acid or related product which is retained in the mother liquors, coupled with the inherent loss during concentration of the mother liquors, thus limits the commercial yield of l-ascorbic acid or its analogues from 2-keto-1-gulonic acid, its analogues, and derivatives thereof, by the concentrated hydrohalic acid method to about 65–70% of theory.

When dilute hydrohalic acid is used in the rearrangement the conversion to rearranged product is considerably lower than with concentrated acid. Recovery of rearranged product then requires concentration of rearrangement solution followed by crystallization and concentration of mother liquors as previously described, and thus results in considerable loss of product by decomposition. It has been proposed to neutralize at least part of the hydrohalic acid prior to concentration. This reduces the loss due to decomposition of product during concentration, but at the same time new losses are introduced in separating the inorganic salt formed in neutralization.

It is now discovered, according to the present invention, that it is possible to separate hydrohalic acids almost quantitatively from aqueous hydrohalic acid solutions of l-ascorbic acid and the like without decomposition of the vitamin, and to produce essentially colorless aqueous solutions of the vitamin substantially free of inorganic components, by treating such hydrohalic acid solution with a basic lead or silver compound to precipitate the hydrohalic acid as insoluble lead or silver halide, filtering off the insoluble halide; and when hydrohalic acid is removed as lead halide, precipitating the traces of soluble lead remaining in the filtrate with hydrogen sulfide gas, and filtering off the sulfide precipitate. Basic compounds which are suitable for this process include lead oxide, lead hydroxide, lead carbonate, silver oxide, silver carbonate, and the like.

Regarded in certain of its broader aspects the novel process, according to this invention, comprises treating a solution of an ascorbic acid compound of the class consisting of l-ascorbic acid and analogues thereof in aqueous hydrohalic acid, with a substance of the class consisting of basic lead and silver compounds, filtering off the insoluble halide thus formed and recovering an aqueous solution of the ascorbic acid compound essentialy free of hydrohalic acid. Traces of lead remaining in solution after filtering off the lead halide are removed by treating the filtrate with hydrogen sulfide gas and filtering off the lead sulfide precipitate thus formed.

It will be noted that this process differs from conventional neutralization procedures where hydrohalic acid is neutralized with sodium hydroxide, sodium carbonate, or the like in that the hydrohalic acid is treated with an insoluble basic lead or silver compound to form an insoluble halide. The hydrohalic acid is thereby completely removed from solution without the substitution of undesired soluble inorganic components in the solution.

It was hardly to be expected that this process would provide a means for quantitatively recovering l-ascorbic acid in aqueous solution from an aqueous hydrohalic acid solution of l-ascorbic acid as it is reported in the literature that the lead ion can be used to precipitate ascorbic acid from aqueous solution as lead ascorbate. It is found, however, that in the process here disclosed that no appreciable quantity of lead ascorbate precipitates.

If the rearrangement mixture contains a high percentage of l-ascorbic acid or the like, viz., approaching or exceeding saturation at room temperature, it is preferable to reduce this concentration by diluting the rearrangement mixture or by crystallizing out a first crop of crude l-ascorbic acid and then diluting the mother liquor. In this way crystallization of l-ascorbic acid during removal of the hydrohalic acid is prevented, and adsorption of l-ascorbic acid by the lead or silver halide precipitate is reduced to a minimum. It will be noted in this connection that halide precipitates are crystalline, free-filtering, and readily washed free of l-ascorbic acid.

The diluted hydrohalic acid solution may first be decolorized by treating with a small amount of activated charcoal and filtering. An amount of basic lead or silver compound equivalent to the hydrohalic acid present is added to the solution with stirring and the temperature is held, with cooling if necessary, below about 45° C. Maximum recovery of the ascorbic acid compound is attained when the stoichiometric quantity of the basic compound is employed. This is apparently due to the fact that lead or silver ions in solution tend to catalyze decomposition of the ascorbic acid compound. However, as it is difficult to determine the exact stoichiometric quantity of basic compound required and further, as both the basic compound and the halide formed in the reaction are substantially insoluble, it is found that in commercial application a substantial excess of the basic compound can be used without serious reduction in the amount of ascorbic acid compound recovered.

Neutralization of the hydrohalic acid with lead or silver carbonate is particularly advantageous as no heat is evolved in the reaction and cooling is unnecessary. The neutralization proceeds at a gradual and relatively uniform rate even when all of the carbonate is added at once and no care is needed to avoid excessive foaming due to carbon dioxide liberated.

The precipitated lead or silver halide is then filtered off, preferably at about room temperature, and the filter cake is washed with a small amount of cold water. In the case of lead halide the filtrate and washings contain a small amount of soluble lead halide from which the lead ion is quantitatively removed by passing hydrogen sulfide gas through the solution, preferably in the presence of a small amount of activated charcoal, and filtering off the lead sulfide precipitate. In the case of silver halides, which are almost completely insoluble, the filtrate and washings are completely free of hydrohalic acid and essentially free of silver ions, and the treatment with hydrogen sulfide is therefore not essential.

The resulting aqueous solution of l-ascorbic acid or an analogue thereof is of good color and contains as high as 98% of the l-ascorbic acid originally present in the solution before treatment with the basic lead or silver compound. The product is readily recovered from the solution by known methods as, for example, by vacuum concentration and crystallization.

An important practical aspect of the invention is the simple and economical nature of the process in commercial application. While the basic lead and silver compounds are relatively costly reagents, they can be readily regenerated from the halide compounds. The lead compounds in particular can be easily and inexpensively regenerated by treatment of the halides with ammonium hydroxide, sodium hydroxide, sodium carbonate and the like. It is more difficult to recover lead from the sulfide but the amount converted to sulfide is very small.

Throughout the specification reference has been made to rearrangement of 2-keto-1-gulonic acid, its analogues, and derivatives thereof to l-ascorbic acid and its analogues. By the term "analogues" is meant 2 or 3 keto hexonic acids, the corresponding rearranged products which are other ascorbic acids; 2 or 3 keto hexamethylonic acids, the corresponding rearranged products which are desoxy ascorbic acids, and the like. By the term "derivatives" is meant compounds of the type of diacetone 2-keto-1-gulonic acid which are readily hydrolyzed by acid to 2-keto-1-gulonic acid or an analogue thereof.

While the process of the present invention can be used to remove any hydrohalic acid from an aqueous solution containing l-ascorbic acid and the like, it will be understood that from a practical standpoint hydrochloric acid, hydrobromic acid, or hydriodic acid, in the order mentioned, are the hydrohalic acids most likely to be present in rearrangement mixtures containing l-ascorbic acid and the like. The basic lead compounds and the lead halides referred to are divalent-lead or plumbous compounds.

The following examples illustrate methods of carrying out the present invention but it is to be understood that these examples are given by way of illustration and not of limitation.

*Example I*

About 35 g. of diacetone-2-keto-1-gulonic acid monohydrate is dissolved in 17.5 g. of concentrated aqueous hydrochloric acid and the solution is heated and stirred for one hour at 70° C. The resulting solution is cooled and the temperature kept at about 0° C. for 10–12 hours to crystallize out a first crop of crude l-ascorbic acid. The crystals are filtered off, washed, and dried yielding about 11.3 g. of light gray l-ascorbic acid assaying 95% pure, a recovery of 50% of theory. The mother liquor and washings are combined, diluted with an equal volume of water and decolorized by stirring for ½ hour at room temperature with 1 g. of activated charcoal and filtering. This solution contains by assay 8.5 g. of l-ascorbic acid and 5.5 g. of HCl.

About 18 g. of litharge (plumbous oxide), which is slightly in excess of that equivalent to the HCl, is added to the solution and stirred for 15 minutes while keeping the temperature at about 40° C. The mixture is then cooled to about 20° C. and the precipitated lead chloride is filtered off and washed with 2×15 cc. of cold water. About 0.4 g. of activated charcoal is added to the filtrate and hydrogen sulfide gas is bubbled in with stirring for a sufficient time to precipitate the lead remaining in the filtrate as lead sulfide. The lead sulfide-charcoal is filtered off and washed with 3×10 cc. of water. The filtrate contains by assay about 0.1% of HCl and about 7.6 g. of l-ascorbic acid (approximately 90% recovery from the original mother liquor).

The filtrate is concentrated under vacuum and at a temperature of 40–50° C. to small volume and l-ascorbic acid is crystallized out and recovered by filtration, washing and drying. Further concentration of mother liquor and washings yields additional crystalline product, and a total of approximately 6.3 g. of nearly white l-ascorbic acid, assaying about 98% pure, is thus obtained.

The overall yield of crude l-ascorbic acid from the diacetone-2-keto-1-gulonic acid monohydrate is therefore 17.6 g. containing by assay 16.9 g. of pure l-ascorbic acid, about 80% of theory.

The lead chloride precipitate is slurried with 100 cc. of water, cooled to about 60° C. and treated, with vigorous stirring, with 100 cc. of a solution containing 19 g. of concentrated aqueous ammonium hydroxide. The resulting slurry is cooled to about room temperature, filtered, washed free of ammonium chloride and dried. The lead hydroxide thus obtained contains by assay 16.8 g. of lead oxide.

Example II

The procedure of Example I is repeated using a quantity of litharge which is the stoichiometric equivalent of the HCl in the rearrangement solution, and washing the lead chloride precipitate after filtration with 3×20 cc. of cold water. The filtrate and washings thus obtained contain by assay about 8.3 g. of l-ascorbic acid (approximately 98% recovery from the original mother liquor).

Concentration and crystallization of the filtrate and washings yields about 7.4 g. of almost white crystalline l-ascorbic acid assaying about 98% pure. The overall yield of crude l-ascorbic acid from diacetone-2-keto-l-gulonic acid monohydrate is therefore 18.7 g. containing by assay 17.3 g. of pure l-ascorbic acid, about 82% of theory.

Example III

About 35 g. of diacetone-2-keto-d-gluconic acid is dissolved in 35 g. of 40% hydrobromic acid. The solution is heated with stirring at 70° C. for one hour to effect rearrangement, and the resulting solution is diluted with an equal volume of water, treated with 1 g. of activated charcoal, and filtered to remove tars and colored impurities. About 22 g. of lead oxide is added to the filtrate and stirred for one hour at about 40° C. to convert hydrobromic acid to lead bromide. The solution is then cooled to room temperature and the lead bromide filtered off and washed. About 0.5 g. of activated charcoal is added to the combined filtrate and washings and hydrogen sulfide gas is bubbled in to precipitate the small amount of lead present as lead sulfide, which is filtered off. The filtrate is then given a further treatment with activated charcoal and hydrogen sulfide to insure complete removal of lead ion from the solution. The lead free filtrate is essentially free of hydrobromic acid and contains, by assay, 18.0 g. of d-araboascorbic acid.

The solution is concentrated under vacuum at about 50° C. to a volume of about 37 cc., treated with 1 g. of activated charcoal at 60° C., filtered, and cooled to about 0° C. The solution is allowed to stand for 8-10 hours at 0° C. to crystallize out a first crop of d-araboascorbic acid which is filtered off and washed. 10.2 g. of d-araboascorbic acid assaying about 99.8% pure is thus obtained; 48.2% of theory based upon the original diacetone-2-keto-d-gluconic acid. By further concentration of the combined mother liquor and washings and crystallization about 7.6 g. of crude d-araboascorbic acid, assaying 95% pure, is obtained. The combined yield of pure and crude product represents an overall yield of 82.5% of theory.

Example IV 75 cc. of an aqueous hydrochloric acid-l-ascorbic acid solution obtained as mother liquor and washings after crystallizing a first crop of crude l-ascorbic acid from a rearrangement solution is diluted to about 125 cc. with water. The dilute solution is determined by assay to contain about 5.2 g. of l-ascorbic acid and 4.3 g. of HCl. The solution is treated with about 1 g. of activated charcoal and filtered to remove colored impurities. About 15.7 g. of lead carbonate (approximately the stoichiometric equivalent of the HCl) is added and the mixture is stirred for about an hour. The lead chloride precipitate is then filtered off and washed. The combined filtrate and washings are concentrated to small volume and crystallized in the manner described in Example I and a total yield of 5.0 g. of l-ascorbic acid assaying 96% pure is obtained, representing a recovery of approximately 92.3% based upon the amount of l-ascorbic acid in the original mother liquor and washings.

The lead chloride is suspended in about 300 cc. of water and heated to boiling with strong agitation. The calculated amount of soda ash equivalent to the lead chloride is added slowly to the agitated mixture being careful to avoid excessive foaming. Additional soda ash is added, if necessary, to make the mixture definitely alkaline to phenolphthaline. Boiling is continued for about three hours after all the soad ash is added and the mixture is then allowed to cool and settle. The precipitated lead carbonate is filtered off and washed until the remaining chloride is negligible.

The lead carbonate thus recovered is suitable for use in treatment of additional aqueous hydrochloric-l-ascorbic acid solution.

Example V

About 180 cc. of mother liquor and washings obtained after crystallizing a first crop of crude l-ascorbic acid from a hydrochloric acid rearrangement solution is found by assay to contain approximately 12.8 g. of l-ascorbic acid and 8.3 g. of HCl. This solution is diluted with about 180 cc. of water and treated with about 1.5 g. of activated charcoal to remove colored impurities. Approximately 26.3 g. of silver oxide is then added and the mixture is stirred for about one-half hour during which time the chloride ion is removed from solution as silver chloride. The silver chloride is filtered off and the filter cake is washed with about 3×15 cc. of water. The aqueous solution thus obtained is essentially free of HCl and contains by assay 12.4 g. of l-ascorbic acid, or 97% of that originally present in the mother liquor.

Modifications may be made in carrying out the present invention without departing from the spirit and scope thereof, and the invention is to be limited only by the appended claims.

What is claimed is:

1. The process that comprises treating a solution of an ascorbic acid compound of the class consisting of ascorbic acids and desoxy ascorbic acids in aqueous hydrohalic acid, with a substance of the class consisting of insoluble basic silver and divalent lead compounds, filtering off the insoluble halide thus formed, and recovering an aqueous solution of the ascorbic acid compound essentially free of hydrohalic acid.

2. The process that comprises treating a solution of an ascorbic acid compound of the class consisting of ascorbic acids and desoxy ascorbic acids in aqueous hydrohalic acid, with an insoluble basic divalent lead compound, filtering off the insoluble lead halide thus formed, and recovering an aqueous solution of the ascorbic acid compound essentially free of hydrohalic acid.

3. The process that comprises treating a solution of an ascorbic acid compound of the class consisting of ascorbic acids and desoxy ascorbic acids in aqueous hydrohalic acid, with an insoluble basic divalent lead compound, filtering off the insoluble lead halide thus formed, recovering an aqueous solution of the ascorbic acid compound essentially free of hydrohalic acid and containing a small amount of dissolved lead halide, and removing the lead from said solution by treating the solution with hydrogen sulfide gas and filtering off the insoluble lead sulfide thus formed.

4. The process for recovering an ascorbic acid compound of the class consisting of ascorbic acids and desoxy ascorbic acids from a rearrangement solution comprising a compound of the class described in aqueous hydrohalic acid solution, that comprises first reducing the concentration of the ascorbic acid compound to at least the point where no crystallization thereof will occur at room temperature, treating the solution thus obtained with a substance of the class consisting of insoluble basic silver and divalent lead compounds, filtering off the insoluble halide thus formed, and recovering an aqueous solution of the ascorbic acid compound essentially free of hydrohalic acid.

5. The process for removing hydrohalic acid from an aqueous hydrohalic acid solution of an ascorbic acid compound of the class consisting of ascorbic acids and desoxy ascorbic acids, that comprises treating said solution with an amount of a substance of the class consisting of insoluble basic silver and divalent lead compounds which is substantially equivalent stoichiometrically to the hydrohalic acid in said solution, and filtering off the insoluble halide thus formed.

6. The process that comprises treating a solution of 1-ascorbic acid in aqueous hydrohalic acid, with a substance of the class consisting of insoluble basic silver and divalent lead compounds, filtering off the insoluble halide thus formed, and recovering an aqueous solution of 1-ascorbic acid essentially free of hydrohalic acid.

7. The process that comprises treating a solution of d-araboascorbic acid in aqueous hydrohalic acid, with a substance of the class consisting of insoluble basic silver and divalent lead compounds, filtering off the insoluble halide thus formed, and recovering an aqueous solution of d-araboascorbic acid essentially free of hydrohalic acid.

8. The process that comprises treating a solution of 1-ascorbic acid in aqueous hydrohalic acid, with an insoluble basic divalent lead compound, filtering off the insoluble lead halide thus formed, recovering an aqueous solution of 1-ascorbic acid essentially free of hydrohalic acid and containing a small amount of dissolved lead halide, and removing the lead from said solution by treating the solution with hydrogen sulfide gas and filtering off the insoluble lead sulfide thus formed.

9. The process that comprises treating an aqueous hydrochloric acid solution of 1-ascorbic acid with plumbous oxide, filtering off the insoluble plumbous chloride thus formed, and recovering an aqueous solution of 1-ascorbic acid essentially free of hydrochloric acid.

10. The process that comprises treating an aqueous hydrochloric acid solution of 1-ascorbic acid with plumbous carbonate, filtering off the insoluble plumbous chloride thus formed, and recovering an aqueous solution of 1-ascorbic acid essentially free of hydrochloric acid.

11. The process that comprises treating an aqueous hydrochloric acid solution of 1-ascorbic acid with an amount of plumbous carbonate substantially equivalent stoichiometrically to the hydrochloric acid in said solution, filtering off the insoluble plumbous chloride thus formed, recovering an aqueous solution of 1-ascorbic acid essentially free of hydrochloric acid and containing a small amount of dissolved plumbous chloride, and removing the lead from said solution by treating the solution with hydrogen sulfide gas and filtering off the insoluble lead sulfide thus formed.

HENRY H. BASSFORD, Jr.

REFERENCES CITED

The following references are of record in the file of this patent:

UNITED STATES PATENTS

| Number | Name | Date |
|---|---|---|
| 2,189,830 | Zimma | Feb. 13, 1940 |

FOREIGN PATENTS

| Number | Country | Date |
|---|---|---|
| 461,790 | Great Britain | Feb. 24, 1937 |

OTHER REFERENCES

Szent-Gyorgyi-Biochem. Jour. 22 1394 (1928).

H. R. Rosenberg-Chemistry & Physiology of the Vitamins Interscience Publishers (1924) page 293.

Hackh's Chemical Dictionary 3rd edit. The Blakiston Co. page 54.